United States Patent
Beck

[15] 3,691,485

[45] Sept. 12, 1972

[54] THREE-PORT QUADRATURE HYBRIDS

[72] Inventor: Alfred B. Beck, Torrance, Calif.

[73] Assignee: TRW, Inc., Los Angeles, Calif.

[22] Filed: Aug. 3, 1970

[21] Appl. No.: 60,325

[52] U.S. Cl. ....................333/11, 333/8, 333/9, 333/31 R, 333/84 M

[51] Int. Cl. .........H01p 5/12, H01p 3/08, H01p 9/00

[58] Field of Search....................333/6, 8, 9, 10–11, 333/31, 31 A, 84, 84 M

[56] References Cited

UNITED STATES PATENTS

| | | | |
|---|---|---|---|
| 3,030,501 | 4/1962 | Rapuano | 333/11 X |
| 3,562,674 | 2/1971 | Gerst | 333/31 X |
| 2,951,996 | 9/1960 | Pan | 333/11 X |
| 3,058,071 | 10/1962 | Walsh et al. | 333/11 |
| 3,229,205 | 1/1966 | Pitts et al. | 333/10 UX |
| 3,323,080 | 5/1967 | Schwelb et al | 333/11 |
| 3,346,823 | 10/1967 | Maurer et al. | 333/31 X |

OTHER PUBLICATIONS

Cohn– A Class of Broadband Three–Port Tem–Mode Hybrids in " Ieee Transactions on Microwave Theory and Techniques" Feb. 1968 pp. 110– 112

Parad and Moynihan– "Split–Tee Power Divider" in Ieee IEEE on Microwave Theory and Techniques January 1965 pp. 91– 95

*Primary Examiner*—Eli Lieberman
*Assistant Examiner*—Marvin Nussbaum
*Attorney*—Spensley, Horn & Lubitz

[57] ABSTRACT

Three-port impedance-transforming microwave circuit characterized by an extremely low input VSWR, and having a four-port 90° differential phase shifter coupled to the paired ports of a three-port hybrid. Broadbanding can be accomplished through the use of phase-shifting transmission line sections in the hybrid and the phase shifter.

4 Claims, 5 Drawing Figures

ALFRED B. BECK
INVENTOR
BY
Spensley, Horn & Lubitz
ATTORNEYS

ALFRED B. BECK
INVENTOR.

BY Spensley, Horn & Lubitz
ATTORNEYS

THREE-PORT QUADRATURE HYBRIDS

BACKGROUND OF THE INVENTION

1. Field of the Invention.

This invention relates to the field of microwave coupling circuitry and more particularly to broadband impedance transforming circuitry.

2. Prior Art.

Four-port quadrature hybrids are extensively used in microwave circuitry and have found particular application in power dividing and power combining circuitry, a plurality of the hybrids being connected in binary trees. In such applications the four-port quadrature hybrid provides high source isolation from identical reflected waves at its output ports the reflected waves being diverted to a "dump" resistor connected to its unused input port. The phenomenally low input VSWR thus obtainable effectively results in a constant resistance amplifier module, and individual stages may therefore be cascaded with almost no interaction.

Unfortunately however, many practical problems are encountered in the realization of four-port quadrature hybrids. The tight 3 db. Coupling required between parallel transmission lines leads to the use of either double-sided circuit techniques involving overlapped lines or multilayer circuits to locate an odd-mode coupling plate over the coupling region. The basic design is difficult in either case and extremely close circuit tolerances are required to achieve satisfactory performance, thereby resulting in a relatively high cost.

BRIEF SUMMARY OF THE INVENTION

The present invention is directed toward a three-port circuit which provides the equivalent of a four-port quadrature hybrid, which circuit can be embodied in simple planar printed circuit form and without requiring the use of grounded dump resistors.

In its basic form, the present invention circuit is a conventional three-port hybrid having a four-port 90° differential phase shifter coupled to its paired ports. The circuit may be used to provide a load impedance transformation over a broad frequency band with no increase in circuit complexity, multi-octave bandwidths being attainable by appropriately increasing the complexity of the three-port hybrid and the differential phase shifter while still maintaining a planar circuit configuration.

The fabrication of the present invention circuitry with conventional low-cost printed circuit techniques does not require extremely close circuit tolerances and its design is relatively simple. Since no grounded dump resistors are required, costs are further reduced, and reliability is increased.

Due to the 90° phase shift differential between the two output ports, waves reflected back to the input port from equally mismatched output loads arrive back at the input port with a total phase differential of 180°, this reflected wave cancellation resulting in isolation of the input port from the identically mismatched loads.

DETAILED DESCRIPTION OF THE INVENTION

Figure 1:
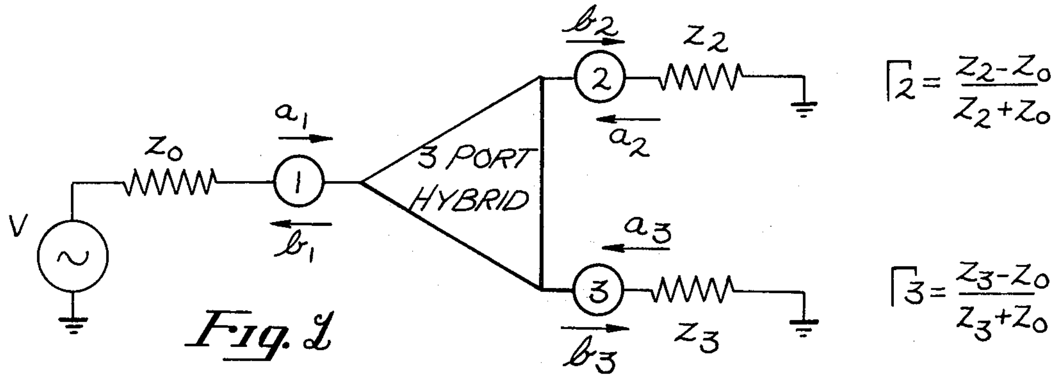
FIG. 1 is the schematic diagram of an idealized three-port hybrid circuit.

Turning now to the drawings, there is shown in FIG. 1 an idealized three-port hybrid circuit, a scattering parameter analysis of which provides the basis for the development of the present invention circuitry. A three-port hybrid is illustrated as having an input port ① and paired output ports ② and ③, the input port being excited by a source including a voltage generator V and its internal impedance $Z_0$, the paired ports being terminated in load impedances $Z_2$ and $Z_3$. The arrows indicate the incident voltage waves $a_1$, $a_2$ and $a_3$, and the reflected voltage waves $b_1$, $b_2$ and $b_3$, the numerical subscripts corresponding to the respective port numbers.

In the scattering parameter analysis the term $S_{11}$ refers to the input reflection coefficient at port ① (and is equal to $b_1/a_1$, the term $S_{12}$ refers to the voltage transmission coefficient from port ① to port ② (and is equal to $b_1/a_2$), the term $S_{12}$ referring to the voltage transmission coefficient from port ② to port ① (being equal to $b_2/a_1$), etc. Since we are dealing with a passive linear circuit, $S_{12}=S_{21}$, $S_{13}=S_{31}$ and $S_{23}=S_{32}$.

Since it is desired that the idealized present invention three-port quadrature hybrid circuitry exhibit the following characteristics:

i. each port should exhibit unity voltage standing-wave ratio (VSWR) with the remaining ports terminated in matched loads;

ii. the output ports should be perfectly isolated from one another;

iii. lossless power division (or combination of coherent sources) should be realized;

iv. the input port should be completely isolated from identically mismatched loads; the scattering patameters of the idealized circuit are therefore constrained.

$$S_{11}=S_{22}=S_{33}=0 \quad (1)$$

$$S_{12}=S_{21}=e-j\beta/\sqrt{2} \quad (2)$$

$$S_{13}=S_{31}=e-j(\beta+\phi)/\sqrt{2} \quad (3)$$

$$S_{23}=S_{32}=0 \quad (4$$

where $\phi=0$ for conventional hybrid $\phi=\pm\pi/2$ for the quadrature hybrid. Equation (1) specifies that all ports are matched, Equations (2) and (3) specifying that there will be a 3 db. power split ($\beta$ referring to some phase shift in radians and $\phi$ referring to the phase shift difference in radians), and equation (4) specifying infinite isolation between output ports (no direct coupling between them).

By substituting in Equations (1), (2), (3) and (4) a set of three simultaneous equations characterizing the network can be simplified as follows:

$$b_1=S_{11}a_1+S_{12}a_2+S_{13}a_3=0+\frac{e^{-j\beta}}{\sqrt{2}}a_2+\frac{e^{-j(\beta+\phi)}}{\sqrt{2}}a_3 \quad (5)$$

$$b_2=S_{21}a_1+S_{22}a_2+S_{22}a_3=\frac{e^{-j\beta}}{\sqrt{2}}a_1+0+0 \quad (6)$$

$$b_3=S_{31}a_1+S_{32}a_2+S_{33}a_3=\frac{e^{-j(\beta+\phi)}}{\sqrt{2}}a_1+0+0 \quad (7)$$

The idealized hybrid may now be easily analyzed for operation into mismatched loads:

$$a_2=\Gamma_2 b_2=\Gamma_2\frac{e^{-j\beta}}{\sqrt{2}}a_1 \quad (8)$$

$$a_3=\Gamma_3 b_3=\Gamma_3\frac{e^{-j(\beta+\phi)}}{\sqrt{2}}a_1 \quad (9)$$

Upon substituting Equations (8) and (9) into Equation (5), there is obtained the following result for the input reflection coefficient:

$$\Gamma_{in}=\frac{b_1}{a_1}=\frac{e^{-j2\beta}}{2}\Gamma_2+\frac{e^{-j2\beta}e^{j2\phi}}{2}\Gamma_3 = \frac{e^{-j2\beta}}{2}[\Gamma_2+\Gamma_3 e^{-j2\phi}] \quad (10)$$

If $\phi=0$, then we have the conventional three-port hybrid, and $$\Gamma_{in}=\frac{e^{-j2\beta}}{2}[\Gamma_2+\Gamma_3] \quad (11)$$

However, if $\phi=\pi/2$, we have the three-port quadrature hybrid, and $$\Gamma_{in}=\frac{e^{-j2\beta}}{2}[\Gamma_2-\Gamma_3] \quad (12)$$

Equations (6), (7) and (12) provide insight into hybrid performance. In either case, if one output port is matched and the other mismatched, $$|\Gamma_{in}|=\frac{|\Gamma_M|}{2} \quad (13)$$

On the other hand, if both output ports are terminated in identical mismatches ($\Gamma_M$), then $$|\Gamma_{in}|=|\Gamma_M| \text{ for the conventional 3-port hybrid} \quad (14)$$

$$\Gamma_{in}=0 \text{ for the 3-port quadrature hybrid} \quad (15)$$

Also, in either case, perfect power division or combination is realized, as can be seen from Equations (6) and (7). In the practical case where $\phi=\pi/2+\epsilon$, the magnitude of the input reflection coefficient for both output ports terminated in identical mismatches ($\Gamma_M$) is $$|\Gamma_{in}|=|\Gamma_M|\ \sin\epsilon \quad (16)$$

where $\epsilon$ = differential phase shift error. The results of Equation (16) may be used to define the reflected wave isolation of the hybrid I(db.)= reflected-wave isolation in db.

$$=10\log_{10} 1/\sin^2\epsilon \quad (17)$$

Equation (17) thus provides an excellent figure of merit for the isolation characteristics of a non-ideal quadrature hybrid.

In Equations (10) through (16) the input reflection coefficient, $\Gamma_{in}$, is the average of the magnitudes of the load reflection coefficients. Thus in Equation (11) it is seen that if the load reflection coefficients are equal ($\Gamma_2 = \Gamma_3$) then the input reflection coefficient is zero. The desirable advantage of the 90° phase shifting case (quadrature hybrid) then becomes immediately apparent, as further shown in Equations (13), (14) and (15). The ultimate cancellation of reflected waves from identically mismatched loads, as indicated by Equation (15), renders the three-port quadrature hybrid particularly suitable for broadbanding purposes.

Figure 2:
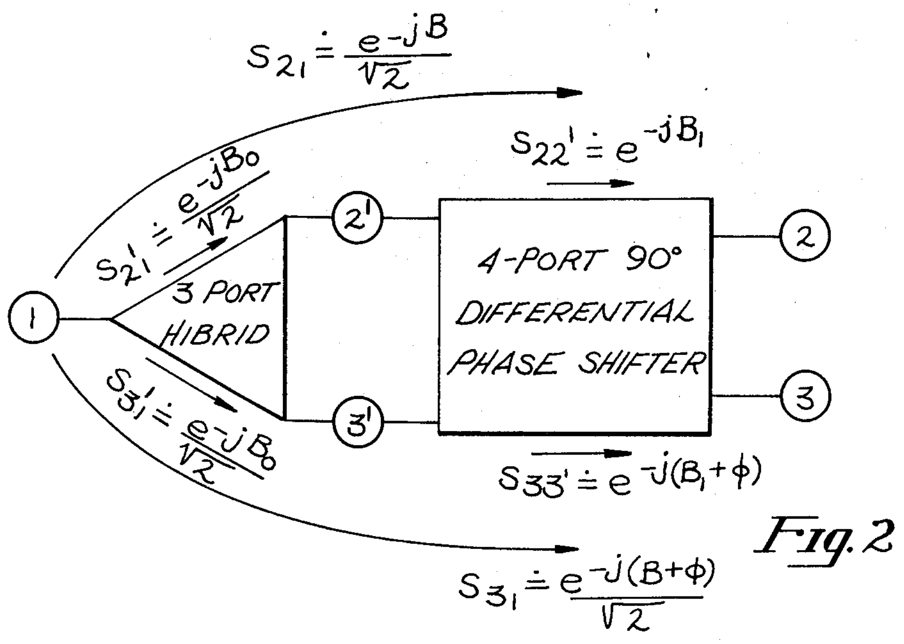
FIG. 2 is the block diagram of a three-port quadrature hybrid in accordance with the present invention.

From the foregoing idealized circuit analysis, it becomes a relatively simple matter to synthesize practical embodiments of three-port quadrature hybrids. Basically, all that needs to be done is to cascade a conventional three-port hybrid with a four-port 90° differential phase shifter, as illustrated in FIG. 2. The design of three-port hybrids and microwave differential phase shift networks is well known in the art and so will not be discussed in detail beyond citing specific publications wherein detailed design procedures can be found. A detailed three-port hybrid design procedure has been published for the case of equal input and output impedances in an article by S. B. Cohn entitled "A Class of Broadband Three-Port TEM-Mode Hybrids," appearing in the IEEE Transactions On Microwave Theory And Techniques, Vol. MTT-16, No. 2, February 1968. This procedure can easily be extended to cover impedance-transforming designs. A detailed design procedure for microwave differential phase shift networks can be found in the IRE Transactions On Microwave Theory and Techniques, April 1958, in the article by B. M. Schiffman entitled "A New Class of Broad-Band Microwave 90-Degree Phase-Shifters." In FIG. 2 the various scattering parameters are set forth adjacent representative arrows. In the scattering parameter equations, $\phi° = 90°\pm\epsilon$, where $\epsilon<5°$ for an octave bandwidth using a Schiffman type-A network for the four-port 90° differential phase shifter. $\beta_0$ represents some initial phase shift through the legs of the hybrid, $\beta_1$ the phase shift occuring in the differential phase shifter, and $\beta$ the overall phase shift through the device.

Figure 3:
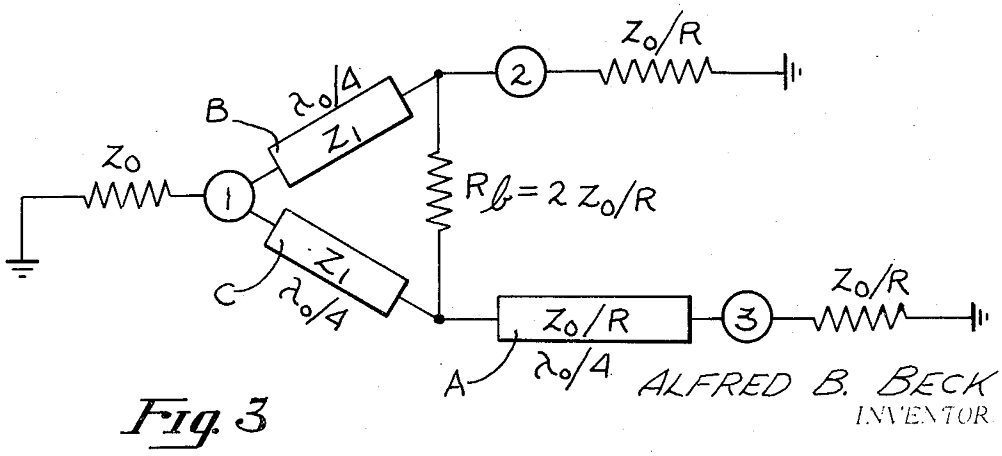
FIG. 3 is the schematic diagram of a simple, relatively narrow band three-port quadrature hybrid circuit.

The actual circuit complexity can vary over wide limits, depending upon the bandwidth desired. The simplest, relatively narrow-band circuit is shown in FIG. 3, the circuit having an input impedance $Z_0$ at port ① and equal output impedances $Z_0/R$ at ports ② and ③. The desired 90° differential phase shift is most conveniently provided by a section of transmission line, A, having a characteristic impedance of $Z_0/R$ and a length ($\lambda_0/4$) equal to one-quarter wave length at the center frequency, R being the impedance transformation ratio.

The three-port hybrid is of the broadbanded type, as discussed in the above-referenced article by S. B. Cohn having a bridging impedance, $R_b$, across its paired ports, $R_b$ being equal to $2Z_0/R$. The three-port hybrid leg impedances are indicated by the reference characters B and C, these impedances also being formed of transmission line sections of a length $\lambda_0/4$ and a characteristic impedance $Z_1=Z_0^2/R$.

Figure 4:
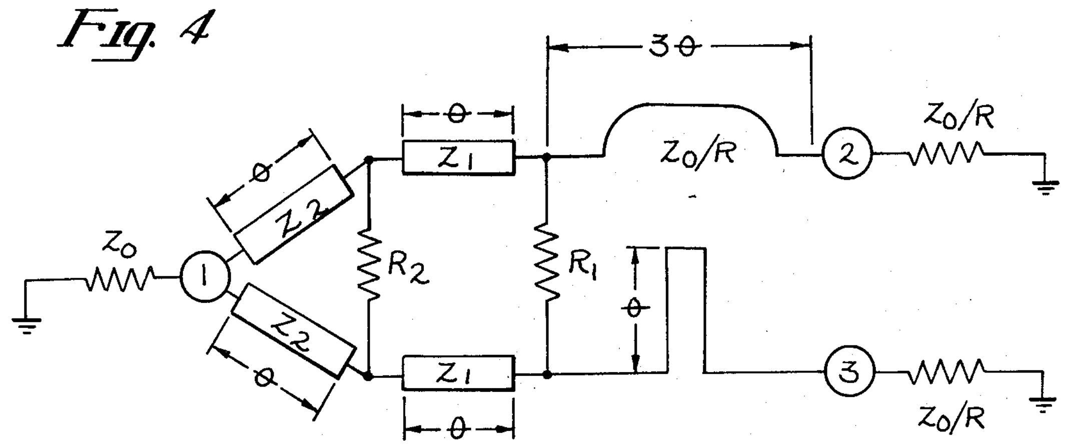
FIG. 4 is the schematic diagram of a broadband three-port quadrature hybrid circuit; and, FIG. 5 is a plan view of a printed circuit embodiment of the circuit of FIG. 4.

FIG. 4 shows a broadband circuit capable of covering an octave with impedance transformation ratios as high as 5:1, i.e., R=5. As in FIG. 3, the input impedance at port 1 is designated $Z_0$ and the output impedances at ports 2 and 3 are designated as $Z_0/R$. The desired 90° differential phase shift at the center frequency is obtained by a section of transmission line introducing a phase shift 3$\theta$, where $\theta$=90° at the center frequency, connected to port 2 and a folded line section connected to port 3. Each leg of the folded line section introduces a phase shift of $\theta$, there being about −6 to −7 db. coupling between the legs. The characteristic impedance of the 3$\theta$ line is $Z_0/R$, the 90° differential phase shifter being designed in accordance with the above-referenced B. M. Schiffman article. Utilizing the Schiffman designations, $Z_{0e}$ is the characteristic impedance of one line to ground when equal in-phase currents flow in both lines, and $Z_{0o}$ is the characteristic impedance of one line to ground when equal out-of-phase currents flow in both lines of the folded section, $Z_{0e}/Z_{0o}$ being within the range of from 2,7 to 3 for the example of FIG. 4. Also, for the example of FIG. 4, $Z_{0e}Z_{0o}/R^2 = (Z_0/RA)^2$.

The three-port hybrid impedances, $Z_1$ and $Z_2$, all introduce a phase shift of $\theta$, their impedance values as well as the values of the bridging impedances $R_1$ and $R_2$ being in accordance with the design criteria set forth in the referenced S. B. Cohn article. Various other combinations and circuit complexities can be formulated from the known design techniques, as determined by the desired bandwidth.

Figure 5:
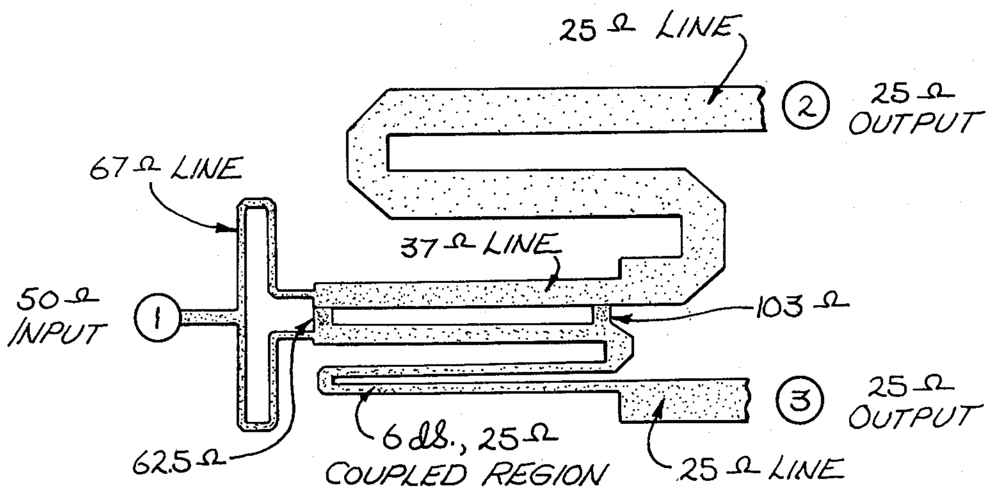

In FIG. 5 there is shown a microstrip transmission line embodiment of the circuit of FIG. 4, as designed for a 1.5–3 gHz. frequency range, and for a 2:1 impedance ratio ($Z_0$=50ohms, $Z_0/R$=25 ohms). The circuit was fabricated on a 0.002 inch thick ceramic substrate having a dielectric constant of 9, through the use of standard printed circuit techniques. This present invention circuit can replace its prior art equivalent of a 3 db. backward-wave four-port coupler having two-section quarter wave 50 ohm-to-25 ohm impedance transformers at each output port, while being simpler and cheaper to fabricate and requiring even less planar area.

Yet another practical application of the present invention three-port impedance-transforming quadrature hybrid is in the first tier of the impedance-transforming binary hybrid tree circuit disclosed in my co-pending patent application Ser. No. 60,324 filed Aug. 3, 1970. Although the binary hybrid tree of that co-pending application theoretically provides a perfect impedance match over a specified frequency range, theoretical perfection is difficult to achieve, due to dimensional tolerances and discontinuities, etc., and the present invention reflected-wave cancellation feature can be easily added merely by inserting a quarter wavelength transmission line section in series with every other terminal port of the first tier of the tree.

Although the invention has been described with a certain degree of particularity, it is understood that the present disclosure has been made only by way of example and that numerous other embodiments can be developed from the present invention concepts without departing from the spirit and scope of the invention as hereinafter claimed. For example, although it has been found most practical at present to utilize transmission line sections for the impedances comprising the hybrid legs and differential phase shifters, it is theoretically possible to use any kind of impedance of the desired value and phase shift characteristics.

I claim:

1. An impedance transforming microwave circuit having an input port and paired output ports, wherein said input port is isolated from equal output loads, mismatched to the output impedance of said circuit comprising a three-port hybrid having substantially zero phase difference between the paired output ports and having a four-port 90° differential phase shifter connected across its paired ports.

2. A hybrid circuit comprising a three-port hybrid having an input port and a pair of output ports and a four port 90° phase shifter, said three port hybrid having a first section with a first pair of equal length transmission lines each connecting said input port to one of a pair of first section output junctions, said first section output junctions being connected through a resistive element, and at least one second section connected in series to said first section, said second sections having a pair of input junctions each connected to one of a pair of output junctions through equal length transmission lines, said output junctions of said second sections being connected through a resistive element, the output junctions of the last of said second sections defining said pair of output ports of said three-port hybrid, said 90° phase shifter being connected to said pair of output ports of said three-port hybrid.

3. The circuit of claim 1 wherein said four-port 90° differential phase shifter is comprised of a first section of transmission line and a second section of transmission line, said second section of transmission line being a folded line section.

4. The circuit of claim 2 wherein said four-port 90° differential phase shifter is comprised of a first section of transmission line and a second section of transmission line, said second section of transmission line being a folded line section.

* * * * *